(12) United States Patent
Kuo et al.

(10) Patent No.: US 10,708,848 B1
(45) Date of Patent: Jul. 7, 2020

(54) COMMUNICATION SYSTEM AND COMMUNICATION METHOD

(71) Applicant: HTC Corporation, Taoyuan (TW)

(72) Inventors: Yen-Liang Kuo, Taoyuan (TW);
Ta-Chun Pu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/239,550

(22) Filed: Jan. 4, 2019

(51) Int. Cl.
| | |
|---|---|
| *H04W 40/34* | (2009.01) |
| *H04W 64/00* | (2009.01) |
| *H04B 1/3827* | (2015.01) |
| *H04B 7/145* | (2006.01) |

(52) U.S. Cl.
CPC ............ *H04W 40/34* (2013.01); *H04B 1/385* (2013.01); *H04B 7/145* (2013.01); *H04W 64/006* (2013.01); *H04B 2001/3866* (2013.01)

(58) Field of Classification Search
CPC .......... H04B 1/385; H04B 7/14; H04B 7/145; H04B 7/15; H04W 64/006; H04W 40/20; H04W 40/204; H04W 40/34; H04W 4/02
See application file for complete search history.

(56) References Cited

U.S. PATENT DOCUMENTS

| | | | |
|---|---|---|---|
| 2004/0167758 A1 | 8/2004 | Takiishi et al. | |
| 2015/0039218 A1* | 2/2015 | Bowers | B60W 30/08 701/301 |
| 2018/0067593 A1* | 3/2018 | Tiwari | G08B 13/04 |
| 2018/0261905 A1* | 9/2018 | Pu | H01Q 1/185 |
| 2018/0316416 A1* | 11/2018 | Reis | H04B 7/18513 |

FOREIGN PATENT DOCUMENTS

WO 2012082963 A1 6/2012

OTHER PUBLICATIONS

Corresponding Taiwan office action dated Sep. 10, 2019.

* cited by examiner

*Primary Examiner* — Thanh C Le
(74) *Attorney, Agent, or Firm* — CKC & Partners Co., LLC

(57) ABSTRACT

Present disclosure relates to a communication system including a first signal transceiver, a second signal transceiver and a signal delivery structure. The second signal transceiver has a potential signal blind area. The second signal transceiver is configured to transmit at least one radio frequency signal. The signal delivery structure is coupled to the second signal transceiver. The signal delivery structure is configured to adjust a transmission path from the signal delivery structure to the first signal transceiver, in order to guide the at least one radio frequency signal to the first signal transceiver via the transmission path. The transmission path is not shaded by the potential signal blind area so that the signal delivery structure and the first signal transceiver are on line-of-sight.

17 Claims, 9 Drawing Sheets

--- transmitting at least one radio frequency signal by the second signal transceiver 120 — S210 adjusting a transmission path directing from the signal passing structure 130 to the first signal transceiver 110, by the signal passing structure 130, in order to guide the at least one radio frequency signal to the first signal transceiver 110, wherein the transmission path is not entirely shaded by the potential signal blind area such that the signal passing structure 130 and the first signal transceiver 110 are on line-of-sight — S220

COMMUNICATION SYSTEM AND COMMUNICATION METHOD

BACKGROUND

Technical Field

Present disclosure relates to a communication system and a communication method. More particularly, the present disclosure relates to the system, the method for adapting antenna direction being frequently changed.

Description of Related Art

Simulated environment applications, such as virtual environment and augmented environment, are useful in many fields. Nevertheless, in most of simulated environment systems, communications between head mounted displays (HMDs) and a base station are established via physical cables. Indeed, the HMDs and the base station may be adjusted to communicate with each other via wireless transmission, and current phased array antennas, grouped phased array antennas, or switch antennas may achieve multidirectional beamforming. However, if these antennas were arranged on the HMDs, some potential blind areas that cannot receive signals correctly may be generated in response to a movement or a rotation of a user using the HMDs. As a result, the communications are interrupted.

In view of foregoing, a more stable communication system is required in this field.

SUMMARY

An aspect of present disclosure is to provide a communication system. The communication system comprises a first signal transceiver, a second signal transceiver and a signal passing structure. The first signal transceiver has a potential signal blind area. The second signal transceiver is configured to transmit at least one radio frequency signal. The signal passing structure is coupled to the second signal transceiver. The signal passing structure is configured to adjust a transmission path directing from the second signal passing structure to the first signal transceiver, in order to guide the at least one radio frequency signal to the first signal transceiver via the transmission path. The transmission path is not entirely shaded by the potential signal blind area such that the signal passing structure and the first signal transceiver are on line-of-sight.

Another aspect of present disclosure is to provide a communication method for operating a communication system. The communication system comprises a first signal transceiver, a second signal transceiver and a signal passing structure. The signal passing structure is coupled to the second signal transceiver and the first signal transceiver has a potential signal blind area. The communication method comprises: transmitting at least one radio frequency signal by the second signal transceiver; and adjusting a transmission path directing from the second signal passing structure to the first signal transceiver, by the signal passing structure, in order to guide the at least one radio frequency signal to the first signal transceiver via the transmission path, wherein the transmission path is not entirely shaded by the potential signal blind area such that the signal passing structure and the first signal transceiver are on line-of-sight.

According to the foregoing, the embodiments of present disclosure provides a communication system and communication method that ensures a characteristic of line-of-sight between the signal passing structure and the signal transceiver. The configuration can reduce the chance of disconnections and provide stable signal transmissions.

DETAILED DESCRIPTION

Figure 1:
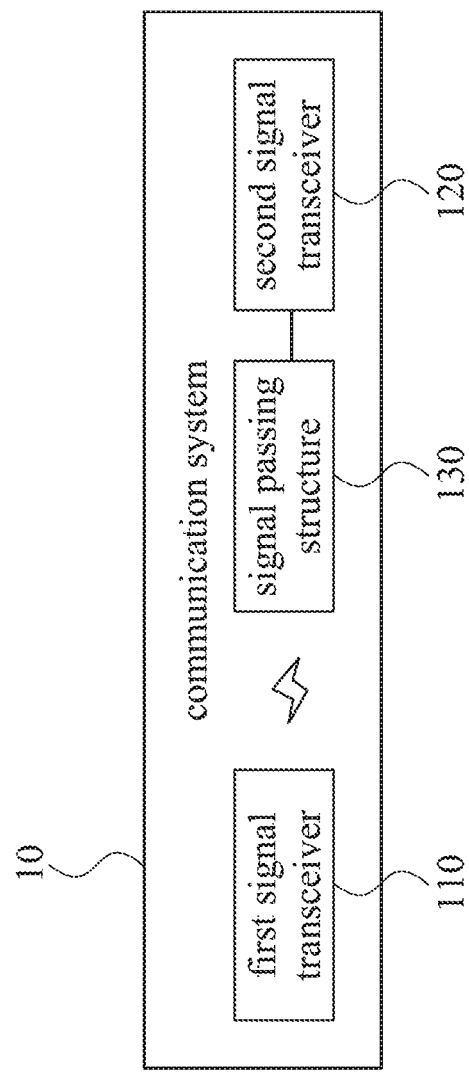
FIG. 1 is a schematic diagram showing a communication system according to an embodiment of present disclosure.

Reference will now be made in detail to the present embodiments of the disclosure, examples of which are illustrated in the accompanying drawings. Wherever possible, the same reference numbers are used in the drawings and the description to refer to the same or like parts.

The terminology used herein is for the purpose of describing particular embodiments only and is not intended to be limiting of the disclosure. As used herein, the singular forms "a," "an," and "the" are intended to include the plural forms as well, unless the context clearly indicates otherwise.

It will be understood that, although the terms "first," "second," etc., may be used herein to describe various elements, these elements should not be limited by these terms. These terms are used to distinguish one element from another.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

As used herein, the terms "comprising," "including," "having," and the like are to be understood to be open-ended, i.e., to mean including but not limited to.

As used herein, the term "and/or" includes any and all combinations of one or more of the associated listed items.

Furthermore, relative terms, such as "upper" or "top", "lower" or "bottom", "left", "right", "front" or "rear" may be used herein to describe one element's relationship to another element as illustrated in the Figures. It will be understood that relative terms are to describe various elements, and these elements should not be limited by these terms.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

FIG. 1 is a schematic diagram showing a communication system according to an embodiment of present disclosure. As shown in FIG. 1, in some embodiments, a communication system 10 is provided. The communication system 10 includes a first signal transceiver 110, a second signal transceiver 120 and a signal passing structure 130. In some embodiments, the second signal transceiver 120 is coupled to the signal passing structure 130.

It is noted that, in some embodiments, the first signal transceiver 110 and the second signal transceiver 120 are both an integration of some signal transmitters some and signal receivers. It means that each of them can include at least one signal transmitter and at least one signal receiver. The signal transmitter is configured to send out radio frequency signals and the signal receiver is configured to receive radio frequency signals.

In some embodiments, the first signal transceiver 110 is disposed on a head mounted display (HMD). A user can wear the head mounted display with his/her head. When the user moves in a real space or rotate his/her head, the head mounted display can be moved or rotated correspondingly so that the first signal transceiver 110 can transmit/receive the radio frequency signals. It is noted that the field of view of the first signal transceiver 110 can be moved or rotated according to such changes.

In some embodiments, the second signal transceiver 120 and the signal passing structure 130 form a communication base station that can be used to send radio frequency signals to the first signal transceiver 110 or to receive radio frequency signals from the first signal transceiver 110. In some embodiments, through the first signal transceiver 110, the second signal transceiver 120 and the signal passing structure 130, the head mounted display can establish bidirectional radio frequency signal transmissions with the communication base station. A virtual reality (VR) system and an augmented reality (AR) system can be built on such configuration of signal transmissions.

Figure 2:
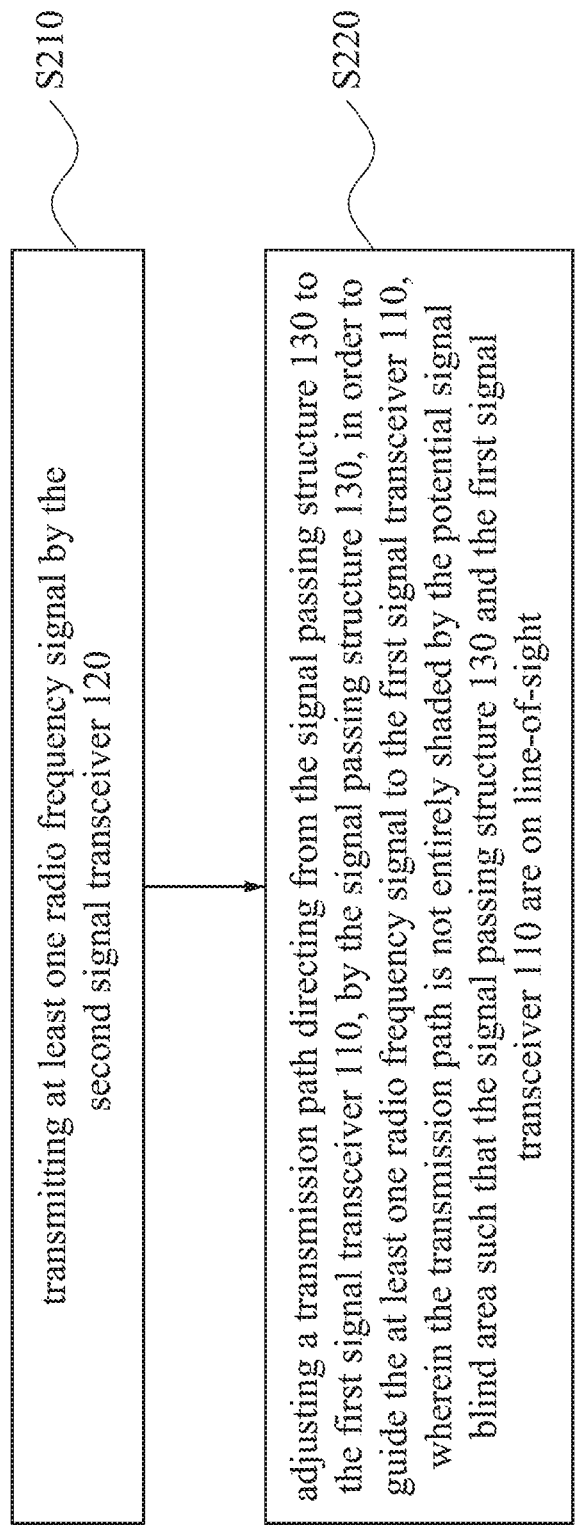
FIG. 2 is a schematic diagram showing a communication method according to an embodiment of present disclosure.

FIG. 2 is a schematic diagram showing a communication method according to an embodiment of present disclosure. In some embodiments, the communication method 200 is performed by the communication system 10 shown in FIG. 1. About the operations of each component of the communication system 10, reference can be made to the embodiments of FIG. 1. Details of the communication method 200 will be introduced in following paragraphs.

Step S210: transmitting at least one radio frequency signal by the second signal transceiver 120.

In some embodiments, the second signal transceiver 120 of the communication system 10 can transmit at least one radio frequency signal. In some embodiments, the at least one radio frequency signal is an extremely high frequency radio frequency signal, such as a millimeter wave radio frequency signal.

It is noted that, in some embodiments, the communication system 10 can be a high frequency radio frequency communication system. The second signal transceiver 120 can transmit at least one radio frequency signal. Ideally, the first signal transceiver 110 can receive the at least one radio frequency signal to complete a radio frequency signal transmission.

However, high frequency radio frequency signal transmissions are based on line of sight between transceivers. If some objects shade the straight path between the transceivers, the signal strength of the transceivers would drop significantly. A disconnection can happen.

Figure 3B:
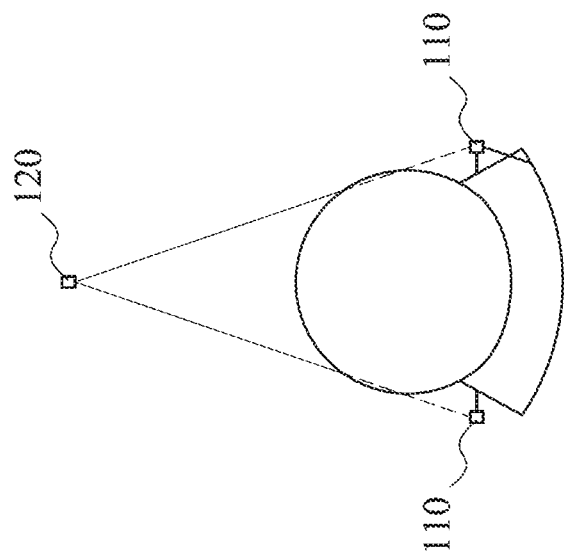
FIG. 3B is a schematic diagram showing a communication system according to an embodiment of present disclosure.
Figure 3A:
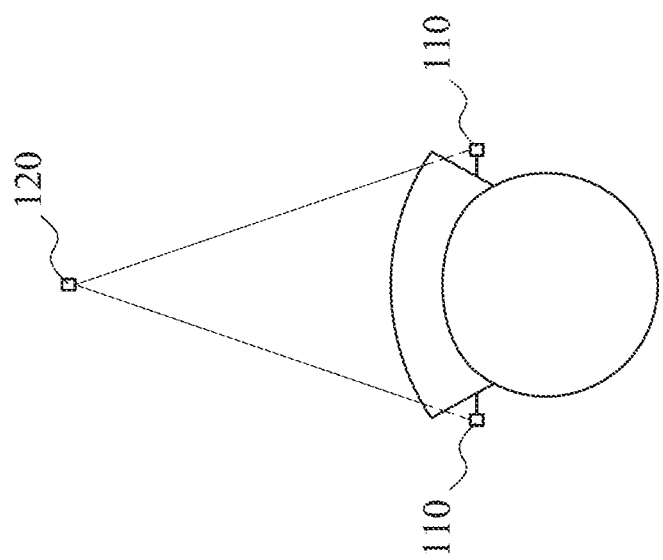
FIG. 3A is a schematic diagram showing a communication system according to an embodiment of present disclosure.

For better understandings, reference can be made to FIG. 3A. FIG. 3A is a schematic diagram showing a communication system according to an embodiment of present disclosure. As shown in FIG. 3A, in some embodiments, when the first signal transceiver 110 is disposed on the head mounted display, a first potential signal blind area can be generated when a body of the head mounted display is standing at a specific position with respect to the first signal transceiver 110. It is to say, a straight path between the first signal transceiver 110 and the second signal transceiver 120 can be shaded by the body of the head mounted display. It makes these signal transceivers are out of line-of-sight.

As mentioned, the first potential signal blind area indicates to an area shading by the body of the head mounted display which makes the first signal transceiver 110 difficult to receive the radio frequency signals. When the second signal transceiver 120 is located in the first potential signal blind area, it makes the first signal transceiver 110 difficult to receive the at least one radio frequency signal from the second signal transceiver 120 effectively.

For better understandings, references can be made to FIG. 3B. FIG. 3B is a schematic diagram showing a communication system according to an embodiment of present disclosure. As shown in FIG. 3B, in some embodiments, when the first signal transceiver 110 is disposed on the head mounted display, a second potential signal blind area can be generated when the user's head is standing at a specific position with respect to the first signal transceiver 110. It is to say, the user's head can shade the straight path between the first signal transceiver 110 and the second signal transceiver 120. It also makes these signal transceivers are out of line-of-sight.

As mentioned, the second potential signal blind area indicates to an area shading by the user's head. It makes the first signal transceiver 110 difficult to receive the radio frequency signals. When the second signal transceiver 120 is located in the second potential signal blind area, it makes the first signal transceiver 110 difficult to receive the at least one radio frequency signal from the second signal transceiver 120 effectively.

Step S220: adjusting a transmission path directing from the signal passing structure 130 to the first signal transceiver 110, by the signal passing structure 130, in order to guide the at least one radio frequency signal to the first signal transceiver 110, wherein the transmission path is not entirely shaded by the potential signal blind area such that the signal passing structure 130 and the first signal transceiver 110 are on line-of-sight.

In some embodiments, the second signal transceiver 120 of the communication system 10 can associate with the signal passing structure 130 to perform the task of the communication base station. The communication base station is used to ensure a transmission path between the second signal transceiver 120 and the first signal transceiver 110. Such transmission path can be a line of sight path to the transceivers. It is noted that the line of sight path indicates a straight path that guarantees the at least one radio frequency signal can be sent from the second signal transceiver 120 to the first signal transceiver 110 without being shaded by the first potential signal blind area and the second potential signal blind area.

It is understood that, the second signal transceiver 120 and the first signal transceiver 110 in the communication base station can be established with some structures shown in the embodiments below.

Figure 4:
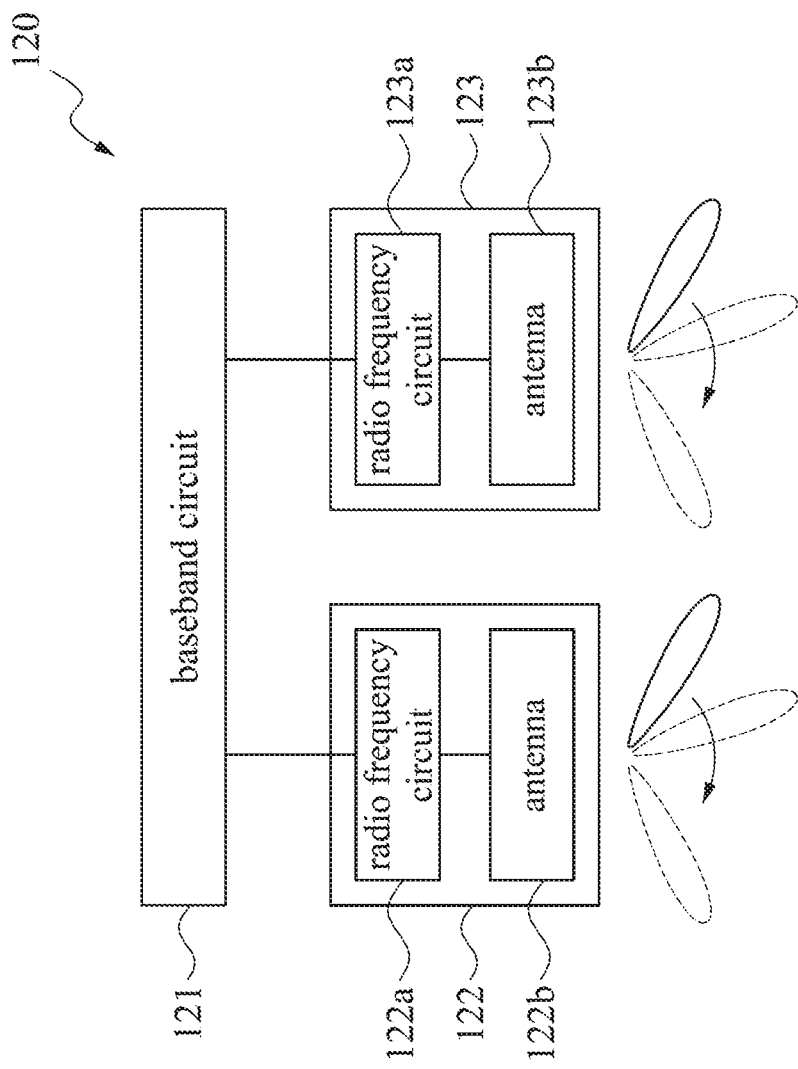
FIG. 4 is a schematic diagram showing some transceivers according to an embodiment of present disclosure.

For better understandings, references can be made to FIG. 4. FIG. 4 is a schematic diagram showing some transceivers according to an embodiment of present disclosure. As shown in FIG. 4, in some embodiments, the signal transceiver 120 includes a baseband circuit 121, a transceiver module 122 and a transceiver module 123. The transceiver module 122 includes a radio frequency circuit 122a and an antenna 122b. The transceiver module 123 includes a radio frequency circuit 123a and an antenna 123b. The baseband circuit 121 is electrically coupled to the radio frequency circuit 122a and the radio frequency circuit 123a.

It is noted that, in some embodiments, the second signal transceiver 120 is electrically coupled to a processor (not shown in figure). The processor can send information to the baseband circuit 121 and the baseband circuit 121 can generate the at least one baseband signal according to the information. In some embodiments, the baseband circuit 121 can selectively deliver the at least one baseband signal to the radio frequency circuit 122a of the transceiver module 122 or deliver the at least one baseband signal to the radio frequency circuit 123a of the transceiver module 123. In some embodiments, the radio frequency circuit 122a and the radio frequency circuit 123a is configured to convert the at least one baseband signal to the at least one radio frequency signal, and transmit the at least one radio frequency signal via the antenna 122b or the antenna 123b, respectively.

In some embodiments, the antenna 122b of the transceiver module 122 or the antenna 123b of the transceiver module 123 can be a multi-beamforming antenna array. It means that the antenna 122b or the antenna 123b can emit the at least one radio frequency signal with multiple beamforming schemes.

In some embodiments, there is a distance between the transceiver module 122 and the transceiver module 123. This distance allows the antenna 122b and the antenna 123b to cover different emitting angles. In some embodiments, at least one of the antenna 122b and the antenna 123b is located outside the first potential signal blind area and the second potential signal blind area. In this case, at least one of the transceiver module 122 and the transceiver module 123 has the line-of-sight transmission path with the first signal transceiver 110. The second signal transceiver 120 can use one of the transceiver module 122 and the transceiver module 123 to emit the at least one radio frequency signal to the first signal transceiver 110.

As shown in the embodiments of FIG. 4, it is understood that the signal passing structure 130 shown in FIG. 1 can be integrated into the transceiver module 122 or the transceiver module 123 shown in FIG. 4. The baseband circuit 121 can selectively transmit the at least one baseband signal to the transceiver module 122 or the transceiver module 123 to form the transmission path.

Figure 5:
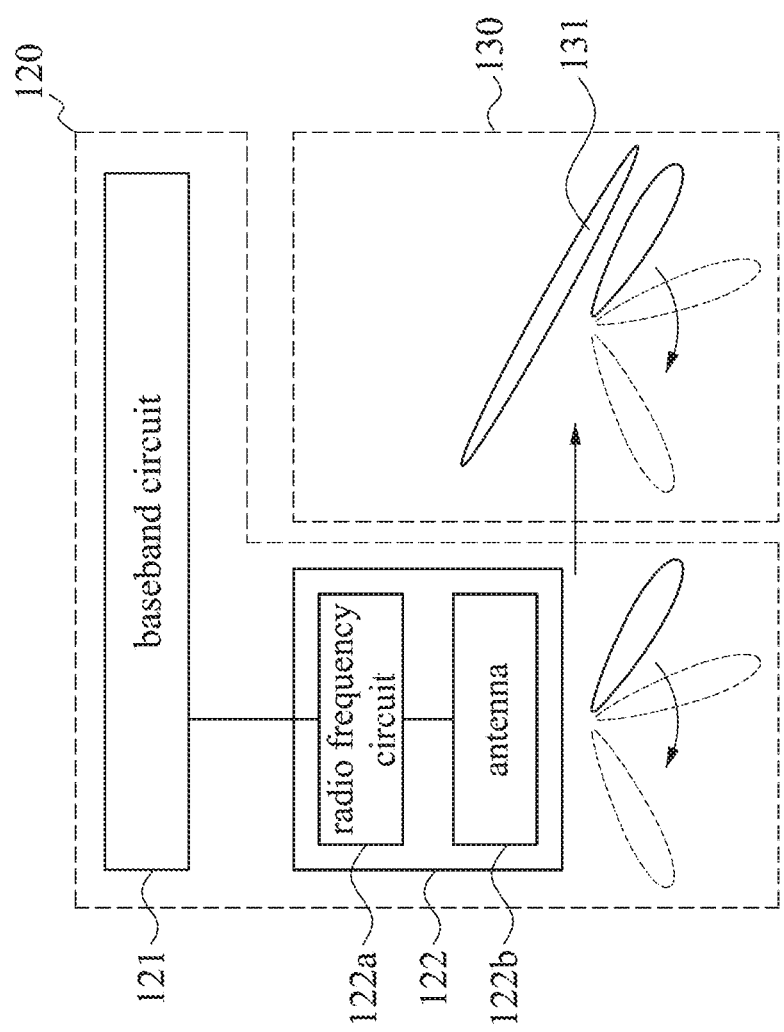
FIG. 5 is a schematic diagram showing some transceivers according to an embodiment of present disclosure.

For better understandings, references can be made to FIG. 5. FIG. 5 is a schematic diagram showing some transceivers according to an embodiment of present disclosure. As shown in FIG. 5, in some embodiments, the second signal transceiver 120 includes the baseband circuit 121 and the transceiver module 122. The transceiver module 122 includes the radio frequency circuit 122a and the antenna 122b. The baseband circuit 121 is electrically coupled to the radio frequency circuit 122a. The signal passing structure 130 includes a reflective structure 131.

It is noted that the operations of the baseband circuit 121, the transceiver module 122, the radio frequency circuit 122a and the antenna 122b can be referred to the foregoing embodiments.

In some embodiments, the antenna 122b can be directed to the reflective structure 131 to emit the at least one radio frequency signal to the reflective structure 131 of the signal passing structure 130. In this way, the reflective structure 131 can reflect the at least one radio frequency signal to a predetermined direction.

In some embodiments, there is a distance between the transceiver module 122 and the transceiver module 123. This distance allows the antenna 122b and the antenna 123b to cover different emitting angles. In some embodiments, at least one of the antenna 122b and the antenna 123b is located outside the first potential signal blind area and the second potential signal blind area. In this case, at least one of the transceiver module 122 and the transceiver module 123 has the line-of-sight transmission path with the first signal transceiver 110. The second signal transceiver 120 can emit the at least one radio frequency signal to the first signal transceiver 110 directly via the transceiver module 122. Alternatively, the transceiver module 122 can emit the at least one radio frequency signal to the reflective structure 131. Then, the reflective structure 131 can guide the at least one radio frequency signal to the first signal transceiver 110.

Figure 6:
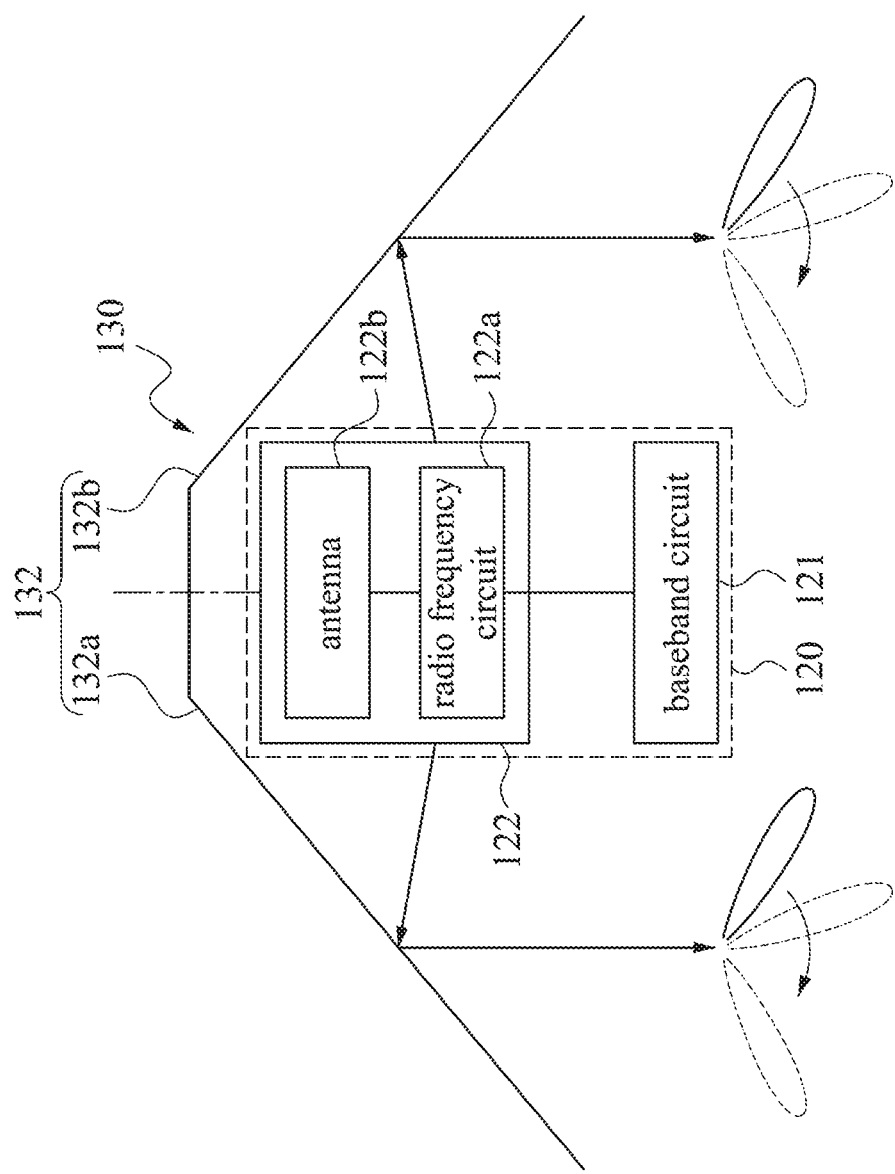
FIG. 6 is a schematic diagram showing some transceivers according to an embodiment of present disclosure.

FIG. 6 is a schematic diagram showing some transceivers according to an embodiment of present disclosure. As shown in FIG. 6, in some embodiments, the second signal transceiver 120 includes the baseband circuit 121 and the transceiver module 122. The signal passing structure 130 includes a reflective structure 132. The transceiver module 122 includes the radio frequency circuit 122a and the antenna 122b. The baseband circuit 121 is electrically coupled to the radio frequency circuit 122a.

It is noted that the operations of the baseband circuit 121, the transceiver module 122, the radio frequency circuit 122a and the antenna 122b can be referred to the foregoing embodiments.

In some embodiments, the antenna 122b can be directed to the reflective structure 132 of the signal passing structure 130 to emit the at least one radio frequency signal to the reflective structure 132. In this way, the reflective structure 132 can reflect the at least one radio frequency signal to a predetermined direction. As shown in FIG. 6, in some embodiments, the reflective structure 132 is partly opened. In the second signal transceiver 120, the baseband circuit 121 and the transceiver module 122 are substantially disposed at the inner side of the reflective structure 132. According to a line extending from the second signal transceiver 120, the reflective structure 132 is substantially divided into a first part 132a and a second part 132b.

In some embodiments, the second signal transceiver 120 can adjust a beamforming direction of the antenna 122b to selectively emit the at least one radio frequency signal to a first radiation point of the first part 132a or to emit the at least one radio frequency signal to a second radiation point of the second part 132b. It is noted that, when the beamforming direction of the second signal transceiver 120 varies, the first radiation point of the first part 132a and the second radiation point of the second part 132b can be different. The at least one radio frequency signal can therefore be guided along different directions.

It is noted that, in some embodiments, according to the beamforming direction of the antenna 122b, at least one of the first radiation point and the second radiation point is located outside the first potential signal blind area and the second potential signal blind area. In this case, at least one of the first radiation point and the second radiation point has the line-of-sight transmission path with the first signal transceiver 110. The second signal transceiver 120 can emit the at least one radio frequency signal to the first radiation point or the second radiation point via the transceiver module 122. The reflective structure 132 can guide the at least one radio frequency signal to the first signal transceiver 110.

Figure 7:
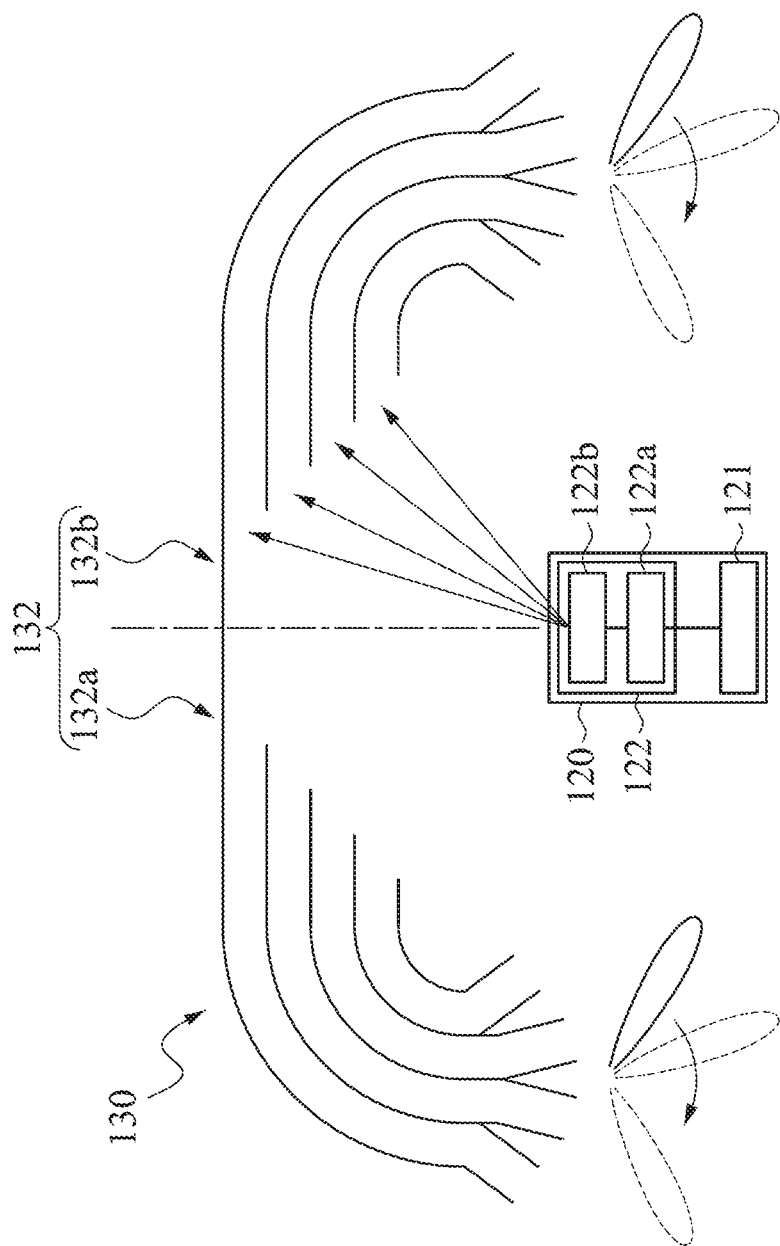
FIG. 7 is a schematic diagram showing some transceivers according to an embodiment of present disclosure.

FIG. 7 is a schematic diagram showing some transceivers according to an embodiment of present disclosure. As shown in FIG. 7, in some embodiments, the second signal transceiver 120 includes the baseband circuit 121 and the transceiver module 122. The signal passing structure 130 includes a wave guide structure 133. The transceiver module 122 includes the radio frequency circuit 122a and the antenna 122b. The baseband circuit 121 is electrically coupled to the radio frequency circuit 122a.

It is noted that the operations of the baseband circuit 121, the transceiver module 122, the radio frequency circuit 122a and the antenna 122b can be referred to the foregoing embodiments.

In some embodiments, the antenna 122b can be directed to the wave guide structure 133 of the signal passing structure 130 to emit the at least one radio frequency signal to the wave guide structure 133. In this way, the wave guide structure 133 can guide the at least one radio frequency signal to a predetermined direction. As shown in FIG. 7, in some embodiments, the wave guide structure 133 is partly opened. In the second signal transceiver 120, the baseband circuit 121 and the transceiver module 122 are substantially disposed at the inner side of the wave guide structure 133. According to a line extending from the second signal transceiver 120, the wave guide structure 133 is substantially divided into a first part 133a and a second part 133b.

In some embodiments, the second signal transceiver 120 can adjust a beamforming direction of the antenna 122b to selectively emit the at least one radio frequency signal to the first part 133a or the second part 133b of the wave guide structure 133. As shown in FIG. 7, each of the first part 133a and the second part 133b includes a plurality of signal passages. It is noted that, when the beamforming direction of the second signal transceiver 120 varies, the at least one radio frequency signal can be guided by some of the plurality of signal passages of the first part 133a or the second part 133b and be sent out from the ends of the first part 133a or the second part 133b.

It is noted that, in some embodiments, at least one end of the passages of the first part 133a or the second part 133b is located outside the first potential signal blind area and the second potential signal blind area. In this case, such end of the passages has the line-of-sight transmission path with the first signal transceiver 110. The second signal transceiver 120 can emit the at least one radio frequency signal to the first part 133a or the second part 133b via the transceiver module 122. These passages can guide the at least one radio frequency signal to the first signal transceiver 110.

Figure 8:
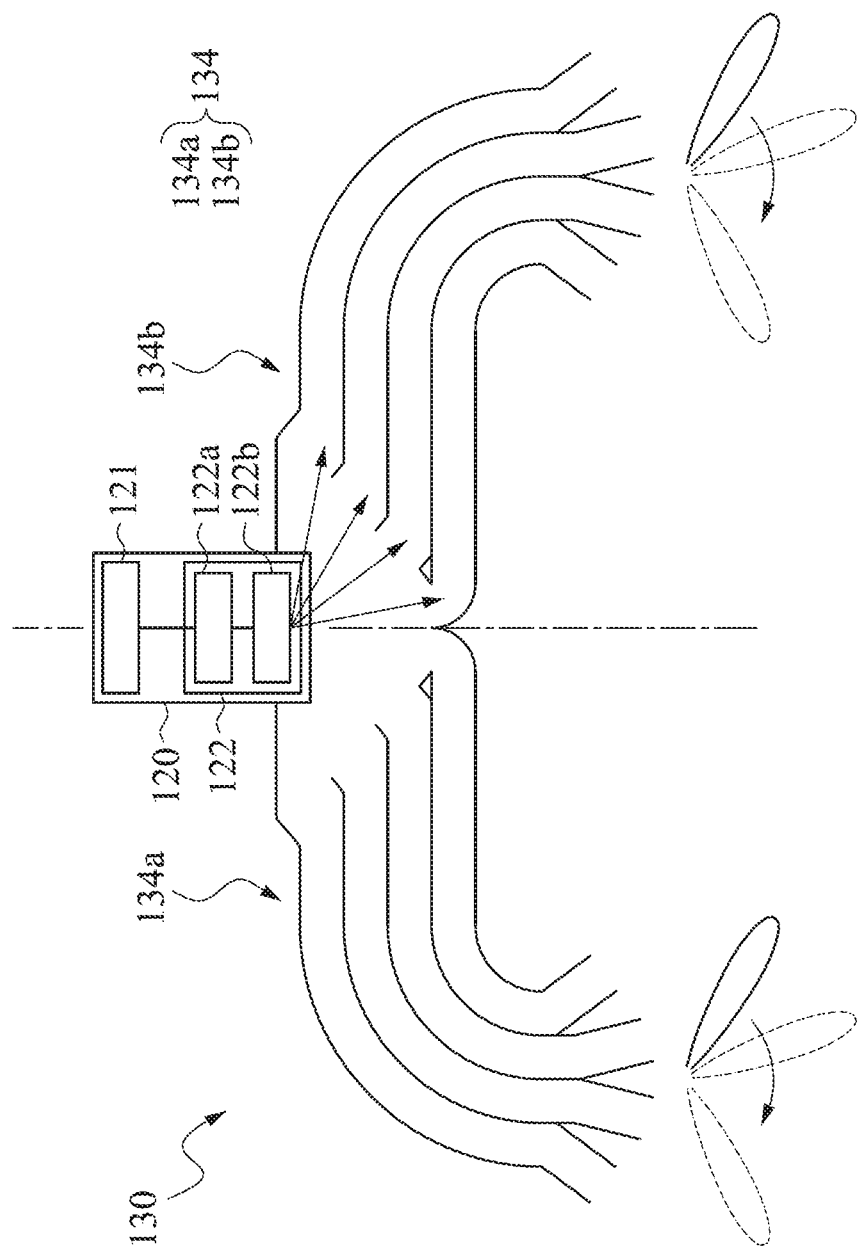
FIG. 8 is a schematic diagram showing some transceivers according to an embodiment of present disclosure.

FIG. 8 is a schematic diagram showing some transceivers according to an embodiment of present disclosure. As shown in FIG. 8, in some embodiments, the second signal transceiver 120 includes the baseband circuit 121 and the transceiver module 122. The signal passing structure 130 includes a wave guide structure 134. The transceiver module 122 includes the radio frequency circuit 122a and the antenna 122b. The baseband circuit 121 is electrically coupled to the radio frequency circuit 122a.

It is noted that the operations of the baseband circuit 121, the transceiver module 122, the radio frequency circuit 122a and the antenna 122b can be referred to the foregoing embodiments.

In some embodiments, the antenna 122b can be directed to the wave guide structure 134 of the signal passing structure 130 to emit the at least one radio frequency signal to the wave guide structure 134. In this way, the wave guide structure 134 can guide the at least one radio frequency signal to a predetermined direction. It is noted that, the wave guide structure 134 shown in FIG. 8 is similar to the wave guide structure 133 shown in FIG. 7. In some embodiments, the wave guide structure 134 is substantially closed. According to a line extending from the second signal transceiver 120, the wave guide structure 134 is substantially divided into a first part 134a and a second part 134b.

Similar to FIG. 7, the first part 134a and the second part 134b of the wave guide structure 134 shown in FIG. 8 can include a plurality of signal passages. The second signal transceiver 120 can adjust a beamforming direction of the antenna 122b to selectively emit the at least one radio frequency signal to some signal passages of the first part 134a or the second part 134b. The at least one radio frequency signal can therefore be guided to some specific directions. At least one end of the passages of the first part 134a or the second part 134b is located outside the first potential signal blind area and the second potential signal blind area. In this case, such end of the passages has the line-of-sight transmission path with the first signal transceiver 110. The second signal transceiver 120 can emit the at least one radio frequency signal to the first part 134a or the second part 134b via the transceiver module 122. These passages can guide the at least one radio frequency signal to the first signal transceiver 110.

It is noted that, in some embodiments, the first signal transceiver 110 can transmit at least one response signal to the second signal transceiver 120 via the transmission path. It is to say, in some embodiments, when the first signal transceiver 110 and the second signal transceiver 120 are on line-of-sight, the first signal transceiver 110 and the second signal transceiver 120 can establish bidirectional information exchanges.

Figure 9B:
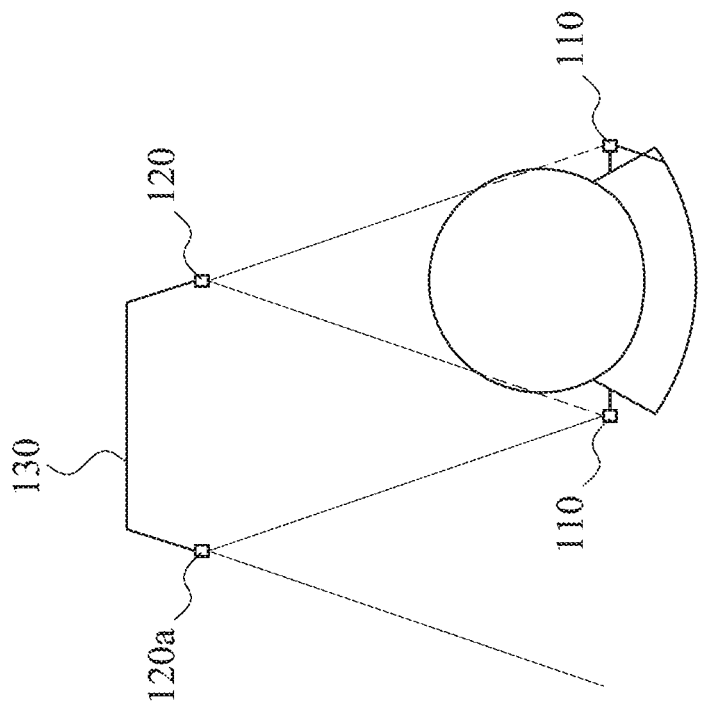
FIG. 9B is a schematic diagram showing a communication system according to an embodiment of present disclosure.
Figure 9A:
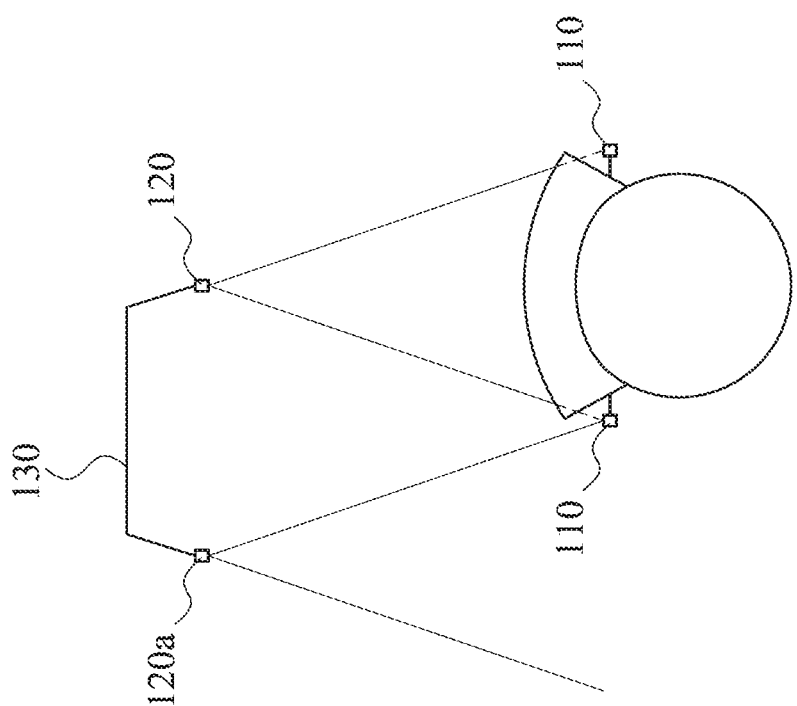
FIG. 9A is a schematic diagram showing a communication system according to an embodiment of present disclosure.

For better understandings, references can be made to FIG. 9A. FIG. 9A is a schematic diagram showing a communication system according to an embodiment of present disclosure. A comparison can be made to FIG. 3A and FIG. 9A. It is shown that, in the embodiments of FIG. 3A, the body of the head mounted display generates the first potential signal blind area for the first signal transceiver 110. In such case, the first signal transceiver 110 and the second signal transceiver 120 are not on line-of-sight. In the embodiments of FIG. 9A, the body of the head mounted display still generates the first potential signal blind area for the first signal transceiver 110. The first signal transceiver 110 and the second signal transceiver 120 are not on line-of-sight, still. However, the signal passing structure 130 can be considered a signal extension. Through a guiding position 120a, the second signal transceiver 120 can emit the at least one radio frequency signal to the first signal transceiver 110. In another words, the guiding position 120a and the first signal transceiver 110 is on line-of-sight.

It is noted that, as shown in FIG. 9A, the radio frequency signals can be guided to the guiding position 120a by the second signal transceiver 120 and the signal passing structure 130 shown in the embodiments of FIGS. 4-8. For example, in the embodiment of FIG. 4, if the angle of transmission of the antenna 122b is limited by the first potential signal blind area, the second signal transceiver 120 can use the antenna 123b to emit the at least one radio frequency signal. In such embodiment, the antenna 123b of the transceiver module 123 can be used to establish the guiding position 120a. For example, in the embodiment of FIG. 6, if the position of the first part 132a of the reflective structure 132 is limited by the first potential signal blind area, the second signal transceiver 120 can emit the at least one radio frequency signal to the second radiation point on the second part 132b of the reflective structure 132. The second part 132b can guide the at least one radio frequency signal to its destination. In such embodiment, the second part 132b of the reflective structure 132 can be used to establish the guiding position 120a.

For better understandings, references can be made to FIG. 9B. FIG. 9B a schematic diagram showing a communication system according to an embodiment of present disclosure. A comparison can be made to FIG. 3B and FIG. 9B. In the embodiments of FIG. 3B, the user's head that wore the head mounted display can generate the second potential signal blind area for the first signal transceiver 110. In such case, the first signal transceiver 110 and the second signal transceiver 120 are not on line-of-sight. In the embodiments of FIG. 9A, the user's head still generate the second potential signal blind area for the first signal transceiver 110. The first signal transceiver 110 and the second signal transceiver 120 are not on line-of-sight, still. However, the signal passing structure 130 can be considered the signal extension. Through the guiding position 120a, the second signal transceiver 120 can emit the at least one radio frequency signal to the first signal transceiver 110. In another words, the guiding position 120a and the first signal transceiver 110 is on line-of-sight.

It is noted that, as shown in FIG. 9B, the radio frequency signals can be guided to the guiding position 120a by the second signal transceiver 120 and the signal passing structure 130 shown in the embodiments of FIGS. 4-8. The operation has been explained in the embodiments of FIG. 9A and will not be repeated here.

In view of foregoing embodiments, present disclosure provides a wireless communication system 10, which can be considered an alternative connection approach between the HMDs and the host computers. When the user applies the communication system 10, the second signal transceiver 120 can associate with the signal passing structure 130 to ensure the line-of-sight transmission path directing from the second signal transceiver 120 to the first signal transceiver 110. The transmission path built by the communication system 10 can guarantee a stable connection between the second signal transceiver 120 and the first signal transceiver 110.

Although the present disclosure has been described in considerable detail with reference to certain embodiments thereof, other embodiments are possible. It will be apparent to those skilled in the art that various modifications and variations may be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A communication system, comprising:
    a first signal transceiver having a potential signal blind area;
    a second signal transceiver, configured to transmit at least one radio frequency signal; and
    a signal passing structure, coupled to the second signal transceiver, wherein when a straight transmission path between the first signal transceiver and the second signal transceiver is shaded by the potential signal blind area, the signal passing structure is configured to adjust the straight transmission path to form a first transmission path directing from the second signal transceiver to the first signal transceiver via the signal passing structure, in order to guide the at least one radio frequency signal to the first signal transceiver via the first transmission path,
    wherein the first transmission path is not entirely shaded by the potential signal blind area such that the signal passing structure and the first signal transceiver are on line-of-sight.

2. The communication system of claim 1, wherein if a straight path directing from the first signal transceiver to the second signal transceiver is not entirely shaded by the potential signal blind area, the second signal transceiver is configured to transmit the at least one radio frequency signal to the first signal transceiver via the straight path.

3. The communication system of claim 2, wherein if the straight path is entirely shaded by the potential signal blind area, the second signal transceiver is configured to transmit the at least one radio frequency signal to the first signal transceiver via the first transmission path.

4. The communication system of claim 1, wherein the at least one radio frequency signal comprises a first radio frequency signal and a second radio frequency signal, the second signal transceiver is configured to selectively transmit the first radio frequency signal to a first radiation point of the signal passing structure or transmit the second radio frequency signal to a second radiation point of the signal passing structure, and the first radiation point and the second radiation point are different.

5. The communication system of claim 4, wherein one of the first radiation point and the second radiation point is on line-of-sight to the first signal transceiver to form the first transmission path directing from the one of the first radiation point and the second radiation point to the first signal transceiver.

6. The communication system of claim 5, wherein the first signal transceiver is configured to receive at least one of the first radiation point and the second radio frequency signal.

7. The communication system of claim 1, wherein the signal passing structure comprises a reflective structure configured to guide the at least one radio frequency signal to the first transmission path therefrom.

8. The communication system of claim 1, wherein the signal passing structure comprises a wave guide structure configured to guide the at least one radio frequency signal to the first transmission path therefrom.

9. The communication system of claim 1, wherein the second signal transceiver comprises:
    a baseband circuit, configured to generate at least one baseband signal;
    a radio frequency circuit, configured to receive the at least one baseband signal from the baseband circuit and convert the at least one baseband signal to the at least one radio frequency signal; and
    an antenna, configured to receive the at least one radio frequency signal from the radio frequency circuit and transmit the at least one radio frequency signal.

10. The communication system of claim 9, wherein the antenna is an adjustable beam-forming antenna.

11. The communication system of claim 1, wherein the at least one radio frequency signal is a millimeter wave signal.

12. The communication system of claim 1, wherein the first signal transceiver is disposed on a head-mounted display device and the potential signal blind area is related to a body of the head-mounted display device.

13. The communication system of claim 1, wherein the first signal transceiver is configured to transmit a response signal to the second signal transceiver via the first transmission path.

14. A communication method for operating a communication system that comprises a first signal transceiver, a second signal transceiver and a signal passing structure, in which the signal passing structure is coupled to the second signal transceiver and the first signal transceiver has a potential signal blind area, the communication method comprising:
   transmitting at least one radio frequency signal by the second signal transceiver; and
   adjusting a straight transmission path to form a first transmission path directing from the second signal passing structure to the first signal transceiver through the signal passing structure when the straight transmission path between the first signal transceiver and the second signal transciever is shaded by the potential signal blind area, in order to guide the at least one radio frequency signal to the first signal transceiver via the first transmission path,
   wherein the first transmission path is not entirely shaded by the potential signal blind area such that the signal passing structure and the first signal transceiver are on line-of-sight.

15. The communication method of claim 14, wherein if a straight path directing from the first signal transceiver to the second signal transceiver is not entirely shaded by the potential signal blind area, the communication method comprises:
   transmitting the at least one radio frequency signal, by the second signal transceiver, to the first signal transceiver via the straight path.

16. The communication method of claim 15, wherein if the straight path is entirely shaded by the potential signal blind area, the communication method comprises:
   transmitting the at least one radio frequency signal by the second signal transceiver, to the first signal transceiver via the first transmission path.

17. The communication method of claim 14, further comprising:
   transmitting a response signal, by the first signal transceiver, to the second signal transceiver via the first transmission path.

* * * * *